United States Patent [19]

Laran et al.

[11] 4,032,619
[45] June 28, 1977

[54] PROCESS FOR THE PREPARATION OF CYANOGEN CHLORIDE

[75] Inventors: Roy Joseph Laran, Greenwell Springs, La.; H. Paul Loftin, Barrington, R.I.; Daniel C. McIntyre, Baton Rouge, La.

[73] Assignee: Ciba-Geigy Corporation, Ardsley, N.Y.

[22] Filed: Jan. 15, 1976

[21] Appl. No.: 649,179

[52] U.S. Cl. .............................. 423/379; 423/383; 423/351; 423/406; 423/500; 423/481
[51] Int. Cl.$^2$ ......................................... C01B 21/18
[58] Field of Search .......... 423/383, 351, 364, 500, 423/371, 406, 379, 481

[56] References Cited
UNITED STATES PATENTS 3,825,658  7/1974  Eckert, Jr. et al. ................ 423/383

OTHER PUBLICATIONS

Supplement & Mellor's Comprehensive Treatise on Inorganic & Theoretical Chemistry vol. VIII, Supplement II, John Wiley & Sons, N.Y., 1968 p. 413.

*Primary Examiner*—Earl C. Thomas
*Attorney, Agent, or Firm*—Karl F. Jorda

[57] ABSTRACT

A process for the preparation of gaseous cyanogen chloride by a procedure involving reaction of hydrogen cyanide with chlorine in the presence of water with formation of hydrogen chloride as a by-product at a concentration of about 10 to 25% by weight and further involving converting by chlorination ammonium chloride, formed through acid-catalyzed hydrolysis of cyanogen chloride and admixed with the hydrogen chloride by-product, to nitrogen trichloride under pressure and at elevated temperature and decomposing the nitrogen trichloride to nitrogen and chlorine thermally or by U.V. radiation.

3 Claims, No Drawings

PROCESS FOR THE PREPARATION OF CYANOGEN CHLORIDE

FIELD OF INVENTION

The present invention relates to the production of cyanogen chloride from hydrogen cyanide and chlorine with hydrogen chloride being a resultant by-product and, more particularly, to the removal of undesirable nitrogen compounds from the hydrogen chloride by-product.

Cyanogen chloride is a valuable intermediate for the production of e.g., cyanuric chloride, the latter compound being, in turn, a useful chemical intermediate in the synthesis of known herbicides, brightening agents, dyes, chemotherapeutic agents, synthetic resins, plastics, rubbers, and other materials.

DESCRIPTION OF THE PRIOR ART

Conventional procedures for producing cyanogen chloride involve reacting hydrogen cyanide and free chlorine in accordance with the following equation:

$$HCN + CL_2 \rightarrow CNCl + HCl$$

An earlier commercial process for preparing cyanogen chloride for conversion into cyanuric chloride is described in U.S. Pat. No. 3,197,273. In this process, chlorine and hydrogen cyanide are charged into the reaction section of a packed column having a purification, washing or scrubbing section, a reaction section, and a stripping section. Water is fed in at the top of the scrubbing section and steam is introduced at the base of the column at the bottom of the stripping section. By maintaining the proper rates of feed of the various materials, the temperature and conditions in the column can be maintained such that a high yield of cyanogen chloride is obtained as a gas at the top of the reactor.

The process of this patent, while it is quite satisfactory with respect to the quality and amount of the product which it is desired to produce, also produces at the bottom of the reactor column a by-product of dilute, i.e. 2-3% aqueous hydrocholoric acid. This by-product is relatively easily disposed of when the quantity thereof is small but in present commercial practice, the amounts produced are so great that they cannot be disposed of simply by discharge into a stream or river without exceeding the amount which can be so discharged as established by pollution control standards. The alternative of concentrating the dilute hydrochloric acid and using it in other processes or selling it, is not economically feasible, since the costs of concentrating the dilute acid are greater than the cost of purchasing concentrated acid from commercial sources.

Processes for the production of the cyanongen chloride under conditions which would produce the by-products aqueous hydrochloric acid at higher concentrations had to be devised and employed in commercial practice.

A method and an apparatus for carrying out the reaction of chlorine and hydrogen cyanide to produce cyanogen chloride are disclosed respectively in U.S. Pat. Nos. 3,567,406 and 3,681,034. In that process and apparatus raw materials are fed into a flooded reaction section of a reaction and scrubbing column and heat from the flooded section of the column is extracted by circulating cooling fluid around the flooded section of the column. By carefully controlling the conditions in the reaction column, a very high rate of conversion to cyanogen chloride can be achieved with production of aqueous hydrochloric acid in concentrations up to about 26%.

Cyanogen chloride/hydrogen chloride mixtures may also be produced by other techniques, in accordance with which the product mixture formed incorporates hydrogen chloride in greater concentrations than produced in the practice of the above-mentioned process of U.S. Pat. No. 3,197,273. Thus, as described in U.S. Pat. No. 3,499,737, reaction mixtures containing by-product aqueous hydrochloric acid in concentrations up to about 20 percent may be produced by sparging gaseous chlorine into a highly acid aqueous reaction medium containing the hydrogen cyanide and chlorine reactants.

Another method and apparatus for carrying out the reaction of chlorine and hydrogen cyanide to produce cyanogen chloride is disclosed in the U.S. Pat. Nos. 3,498,761 and 3,723,065. According to these patents, the two raw materials are fed as a gaseous mixture into a spray chamber and water is sprayed into the spray chamber. By carefully controlling the conditions, a high rate of conversion to cyanogen chloride can be achieved at low hydrolysis losses and production of aqueous hydrochloric acid in concentrations up to about 10%. The reaction can be carried nearer to completion by passing the stripped bottoms from the spray chamber in countercurrent flow to the gaseous output from the spray chamber, and the bottoms from such a reaction apparatus will be near 20% hydrochloric acid. Problems of by-product disposal or by-product recovery have been associated with production of cyanogen chloride under conditions which could produce the by-product aqueous hydrochloric acid at higher concentrations. Losses of the raw material hydrogen cyanide by hydrolysis and from the bottom of the reaction column along with the by-product hydrochloric acid are common. The necessity to keep hydrolysis losses low and substantially eliminate loss of hydrogen cyanide are essential to the successful commercial production of cyanogen chloride.

A part of the problem of overcoming hydrolysis losses is connected with the manner in which cyanogen chloride and chlorine which are present in the reaction medium at the bottom of the reaction part of the apparatus used in producing the cyanogen chloride are removed or stripped from the reaction medium. According to U.S. Pat. No. 3,197,273, this is done by heating the reaction medium with a steam reboiler. While this is satisfactory at the low concentration of the acid in that process, when the process is carried out at higher acid concentrations, heating to strip these materials from the reaction sharply increases hydrolysis.

Methodology and apparatus for stripping cyanogen chloride and chlorine from a highly acid reaction medium is thus very important according to U.S. Pat. No. 3,535,090. This is done by first feeding gaseous chlorine in countercurrent flow to the reaction medium in a packed reaction column at ambient temperatures in order to strip the cyanogen chloride therefrom without causing undue hydrolysis losses, and thereafter heating the thus stripped reaction medium to remove the chlorine therefrom. By keeping the temperature at which the cyanogen chloride is stripped from the reaction medium low, the hydrolysis losses can be kept low, and the later heating of the thus stripped reaction medium to remove the chlorine therefrom does not affect the hydrolysis losses. Stripping by this method reduces hydrolysis losses to as little as one-tenth or less of losses when stripping is carried out by conventional boiling methods.

DETAILED DESCRIPTION OF THE INVENTION

It has been found, however, that such improved processes and techniques for the production of cyanogen chloride notwithstanding, acid-catalyzed hydrolysis of cyanogen chloride does take place and there is obtained ammonium chloride in the by-product hydrogen chloride in accordance with the following chemical equation:

$$CNCl + 2H_2O \xrightarrow{H^+} CO_2 + NH_4Cl$$

The ammonium chloride thus formed is a most undesirable contamination because it tends to be converted in the stripping section of the apparatus used, due to the presence of chlorine, to nitrogen trichloride which is a highly dangerous substance because of its explosive characteristics. It is especially dangerous on phase-change, i.e., on liquefication.

This conversion by chlorination can be illustrated by the following chemical equation:

$$NH_4Cl + 3Cl_2 \rightarrow NCl_3 + 4HCl$$

The present inventive process is, therefore, directed to a procedure for minimizing or eliminating ammonium chloride by deliberately converting it to nitrogen trichloride which in turn is decomposed and thus eliminated.

The aqueous hydrogen chloride solution obtained in the production of cyanogen chloride from hydrogen cyanide and chlorine contains ammonium chloride which must be removed. The presence of ammonium chloride causes formation of dangerous nitrogen trichloride when the aqueous hydrogen chloride solution is stripped with chlorine in order to remove residual cyanogen chloride. However, the conversion of ammonium chloride into nitrogen trichloride is not complete under normal operating conditions. Therefore, the aqueous hydrogen chloride solution obtained after removal of residual cyanogen chloride still contains ammonium chloride which is objectionable in view of pollution standards in connection with the disposal (after neutralization) or with respect to the sale of the aqueous hydrogen chloride.

According to the present inventive concept the stripping operation is carried out under pressure and at elevated temperature whereby all of the ammonium chloride present in the aqueous hydrogen chloride solution is quickly and completely converted into nitrogen trichloride which is then removed with the chlorine gas overhead of the column and subsequently decomposed thermally or by U.V. radiation in accordance with the following reaction:

$$2NCl_3 \rightarrow N_2 + 3Cl_2$$

This novel ammonium chloride chlorination under pressure (10–100 psig, preferably 10 to 60 psig) and at elevated temperature (35°–100° C, preferably 35° to 75° C) results in complete conversion of ammonium chloride into nitrogen trichloride. Up to now the stripping process had always been carried out under conditions which prevent nitrogen trichloride formation because nitrogen trichloride is such a dangerous substance. Surprisingly, the nitrogen trichloride formed under these conditions does not explode under the proposed technique and can be eliminated safely either by U.V. radiation or by thermal decomposition.

The advantages inherent in the process of the present invention are thus very significant. This process solves the problem of the necessary removal of nitrogen compounds, in particular, ammonium chloride, even in small amounts, from by-product hydrochloric acid, in short amounts, from by-products hydrochloric acid, in short reaction times suitable for continuous processing, thus yielding a "clean" hydrochloric acid which conforms to EPA specifications if sold or to chlorine industry standards if used for electrolytic chlorine recovery.

Also a portion of the chlorine produced as a result of the decomposition of nitrogen-trichloride is recovered while the remaining chlorine used is converted to more hydrochloric acid.

The decomposition of the hazardous nitrogen trichloride by-product can be carried out either of two ways:

1. Nitrogen trichloride is known to be unstable in the presence of ultraviolet light. Its decomposition can be effected in the presence of a U.V. source of sufficient intensity in the nitrogen trichloride formation zone or nearby to contract the gaseous product mixture.

2. Nitrogen trichloride is also known to be thermally unstable. The thermal decomposition can be effected either in the synthesis zone (reactor vessel or column), or in attached heated zones to provide the necessary "time at temperature" for complete conversion to nitrogen and chlorine. For instance, a temperature of 100° C for 1 minute is sufficient for such decomposition.

The chlorination of ammonium chloride to produce nitrogen trichloride and its subsequent decomposition are illustrated by the following exemplification.

Chlorination

Five hundred milliliters (535 g) of 15% HCl containing 0.19–0.20% NH₄Cl were charged into a one-liter Parr titanium pressure reactor, and the apparatus assembled and brought to 55° C. in the fume hood and behind a safety shield. After pressurizing with Cl₂ to 60 psig, the reaction time was monitored with a stopwatch. The pressure was adjusted by regulating the in and out valves manually to maintain a Cl₂ sweep through the solution. Periodically, the inlet and exit valves were closed and a sample of the reaction mixture was taken through a liquid dip-leg and exit valve. This sample was forced by the reaction vessel pressure into a tared sample bottle containing KI solution. The KI immediately quenched the chlorine and prevented further reaction with the NH₄Cl so that the remaining NH₄Cl at the recorded time could be determined by ammonia Kjeldahl analysis. After sampling, which is carried out as rapidly as possible, the chlorine inlet and exit valves were again opened and adjusted to 60 psig pressure. The titration was carried out on the sample after Kjeldahl distillation with 200N H₂SO₄ using the Kjeldahl N-point indicator. At 55° C and 60 psig 99.7% of the NH₄Cl was removed in 9 minutes. This reaction followed first order reaction kinetics and this rate of decrease represented a half-life of 1.4 minutes.

Thermal Decomposition

Nitrogen trichloride was generated from an aqueous solution of ammonium chloride (adjusted to Ph 4) by passing it through a 1 × 30 inches pyrex column (packed with Raschig rings) countercurrent to a chlorine gas stream at ambient temperatures and at nearly atmospheric pressure. The $Cl_2$ gas flow was adjusted so that the resultant $NCl_3$ concentration was diluted to 1%. The liquid flow rate was 10 ml/min of this 2000 ppm $NH_4Cl$ solution with a liquid level in the column bottom maintained with a flowmeter. The conversion to $NCl_3$ in such a column was 95–96% as determined by $NH_3$ analyses of bottoms samples. A T and valve arrangement with a gas flow meter controlled what portion of the total stream traveled through a 4 foot section of stainless preheat tubing then through 20 feet of teflon tubing in the thermostated oven at 100° C. Tubing fittings (T joints) were equipped with rubber septums for taking samples. At 100° C. three separate sets of conditions were averaged at $NCl_3$ — $Cl_2$ gas flow rates which corresponded to 0177 minutes residence time of $NCl_3$ at 100° C. Given below are the data for three separate runs.

TABLE

| Residence Times (Minutes) | $NCl_3$–$Cl_2$ at 100° C % $NCl_3$ In | % $NCl_3$ Out | % $NCl_3$ Decomposed |
|---|---|---|---|
| 0.77 | 0.88 | 0.005 | 99.5 |
| 0.77 | 0.79 | 0.03 | 96.2 |
| 0.77 | 1.13 | 0.006 | 99.5 |

The procedure used in operating the column was to start with $NH_4Cl$ solution through the column at 10 ml/min then start with chlorine flow and adjust it at 690 ml/min which represents an excess of 27/1 by weight. After 15–20 minutes of operation, sampling of the gas stream was started before and after the thermostated zone for gas chromatographic analyses. Several analyses at each point were taken after column line and the results averaged. Then the flowrate to the thermostatted zone was changed to provide longer or shorter residence time at temperature and the sampling and analyses repeated.

Decomposition by UV Radiation

Laboratory experiments show that $NCl_3$ can be completely destroyed when exposed to ultraviolet radiation for slightly more than 3 seconds. The data, listed in the Table below, show percent removal of the $NCl_3$ stream (initially about 1 percent) as a function of exposure time.

TABLE

| Effect of UV Exposure Time on $NCl_3$ Decomposition | |
|---|---|
| Time (sec.) | % $NCl_3$ Decomposed |
| 0.85 | 23 |
| 1.6 | 41 |
| 2.2 | 89 |
| 3.1 | 98 |

The laboratory equipment used in this work was the same as that used in the thermal decomposition study with the substitution of the UV reactor for the oven. $NCl_3$ was generated as before by passing chlorine countercurrent to an aqueous ammonium chloride solution. Chlorine flow was adjusted to result in an $NCl_3$ concentration of about 1 percent by volume as analyzed by gas chromatograph. Decreases in $NCl_3$ levels after exposure to UV light were measured by analyses of the exit gas stream. Variable UV exposure times were obtained by covering sections of the one inch diameter quartz tube with vinyl tape such that known volumes and areas were exposed. The exposure time was then calculated from the volume exposed and the gas flow rate.

The ultraviolet apparatus used was the Rayonet Photochemical Chamber Reactor manufactured by the Southern New England Ultraviolet Company. The apparatus consisted of 16 lamps and 2537Å wave length mounted in a circular arrangement with a diameter of ten inches. A 3 foot 1 inch diameter quartz tube was placed in the center wrapped with vinyl tape to the desired exposure. The $NCl_3$ containing gas stream was passed through the tube from bottom to top. Several analyses at each condition were performed on gas samples taken before and after exposure after steady operation was achieved. The same procedure was used to determine the power requirement at the minimum residence time for complete decomposition except that each datum point represents an analysis average obtained with 4, 8, 12 and 16 lamps in the apparatus.

What is claimed is:

1. In a process for the preparation of gaseous cyanogen chloride by a procedure involving reaction of hydrogen cyanide with chlorine in the presence of water with formation of a by-product hydrogen chloride at a concentration of about 10 to 25% by weight, the improvement which comprises converting by chlorination ammonium chloride formed through acid-catalyzed hydrolysis of cyanogen chloride and admixed with the hydrogen chloride by-product to nitrogen trichloride under pressure and at elevated temperature and decomposing the nitrogen trichloride to nitrogen and chlorine thermally or by U.V. radiation.

2. A process according to claim 1, wherein said pressure ranges from 10 to 100 psig and said temperature ranges from 35° to 100° C.

3. A process according to claim 2, wherein said pressure ranges from 10 to 60 psig and said temperature ranges from 35° to 75° C.

* * * * *

UNITED STATES PATENT AND TRADEMARK OFFICE
CERTIFICATE OF CORRECTION

PATENT NO. : 4,032,619
DATED : June 28, 1977
INVENTOR(S) : Roy Joseph Laran, et al It is certified that error appears in the above-identified patent and that said Letters Patent are hereby corrected as shown below:

Column 4, lines 10, 11 and 12, "from by-product hydrochloric acid, in short amounts, from by-products hydrochloric acid, in short reaction times suitable" should read -- from by-product hydrochloric acid, in short reaction times suitable --.

Column 4, line 64, "200 $NH_2So_4$" should read -- 0.0200 $NH_2So_4$ --.

Column 5, line 24, "0177 minutes" should read -- 0.77 minutes --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks